United States Patent
Aoyama et al.

(10) Patent No.: US 7,185,723 B2
(45) Date of Patent: Mar. 6, 2007

(54) SUPPORT SYSTEM FOR A FORKLIFT POWER TRAIN

(75) Inventors: Youichi Aoyama, Kokubunji-machi (JP); Shigeo Shinohara, Yuuki (JP)

(73) Assignee: Komatsu Forklift Co., Ltd., Tokyo (JP)

( * ) Notice: Subject to any disclaimer, the term of this patent is extended or adjusted under 35 U.S.C. 154(b) by 189 days.

(21) Appl. No.: 10/812,415

(22) Filed: Mar. 30, 2004

(65) Prior Publication Data

US 2004/0245037 A1 Dec. 9, 2004

(30) Foreign Application Priority Data

Mar. 31, 2003 (JP) .............................. 2003-095206
Mar. 24, 2004 (JP) .............................. 2004-088128

(51) Int. Cl.
*B66F 9/08* (2006.01)
(52) U.S. Cl. ..................... 180/68.4; 180/300; 180/312; 180/411
(58) Field of Classification Search ................ 180/291, 180/292, 293, 294, 295, 296, 297, 298, 299, 180/300–312, 411, 68.4
See application file for complete search history.

(56) References Cited

U.S. PATENT DOCUMENTS

| | | | | | |
|---|---|---|---|---|---|
| 1,766,925 | A | * | 6/1930 | Moorhouse | 248/612 |
| 1,950,637 | A | * | 3/1934 | Taub | 180/292 |
| 2,837,348 | A | * | 6/1958 | Muller | 280/788 |
| 3,075,601 | A | * | 1/1963 | Muller | 180/295 |
| 5,305,847 | A | * | 4/1994 | Mefford | 180/292 |
| 5,965,949 | A | * | 10/1999 | Fukuda et al. | 290/1 A |
| 6,152,253 | A | * | 11/2000 | Monaghan | 180/291 |
| 6,386,306 | B2 | * | 5/2002 | Contoli et al. | 180/68.4 |
| 6,386,309 | B1 | * | 5/2002 | Park | 180/300 |
| 6,494,286 | B2 | * | 12/2002 | Shimizu et al. | 180/299 |
| 6,729,430 | B2 | * | 5/2004 | Adams et al. | 180/300 |
| 6,732,831 | B2 | * | 5/2004 | Enmeiji et al. | 180/411 |
| 6,880,667 | B2 | * | 4/2005 | Gotou | 180/291 |
| 6,959,922 | B2 | * | 11/2005 | Miyahara | 267/140.3 |
| 6,981,566 | B2 | * | 1/2006 | Unfried et al. | 180/292 |

FOREIGN PATENT DOCUMENTS

| | | |
|---|---|---|
| JP | 61-61225 | 4/1986 |
| JP | 4-107111 | 9/1992 |
| JP | 4-328020 | 11/1992 |
| JP | 5-54041 | 7/1993 |

* cited by examiner

Primary Examiner—Christopher P. Ellis
Assistant Examiner—Cynthia F. Collado
(74) Attorney, Agent, or Firm—Westerman, Hattori, Daniels & Adrian, LLP.

(57) ABSTRACT

There is provided a support system for a forklift power train, having little vibration transmission to a body frame, but capable of effectively suppressing movement of the power train against even a quick movement of a vehicle occurred in such a case as when the vehicle is accelerated, decelerated, turned or the like, and simpler in construction for assembling workability.
In the support structure for a power train of a forklift having a counterweight in the rear part of the body frame, while a front side support is provided at one location positioned at a differential gear case or a frame side cross member and in the vicinity of the roll axis of the power train, a rear side support is provided at two locations, on the right and left sides of the roll axis of the power train, respectively, in the rear part of the body frame, thereby supporting the power train at three locations in all.

5 Claims, 7 Drawing Sheets

SUPPORT SYSTEM FOR A FORKLIFT POWER TRAIN

FIELD OF THE INVENTION

The invention relates to a support system for a forklift power train including an engine and a transmission.

BACKGROUND OF THE INVENTION

Figure 10:
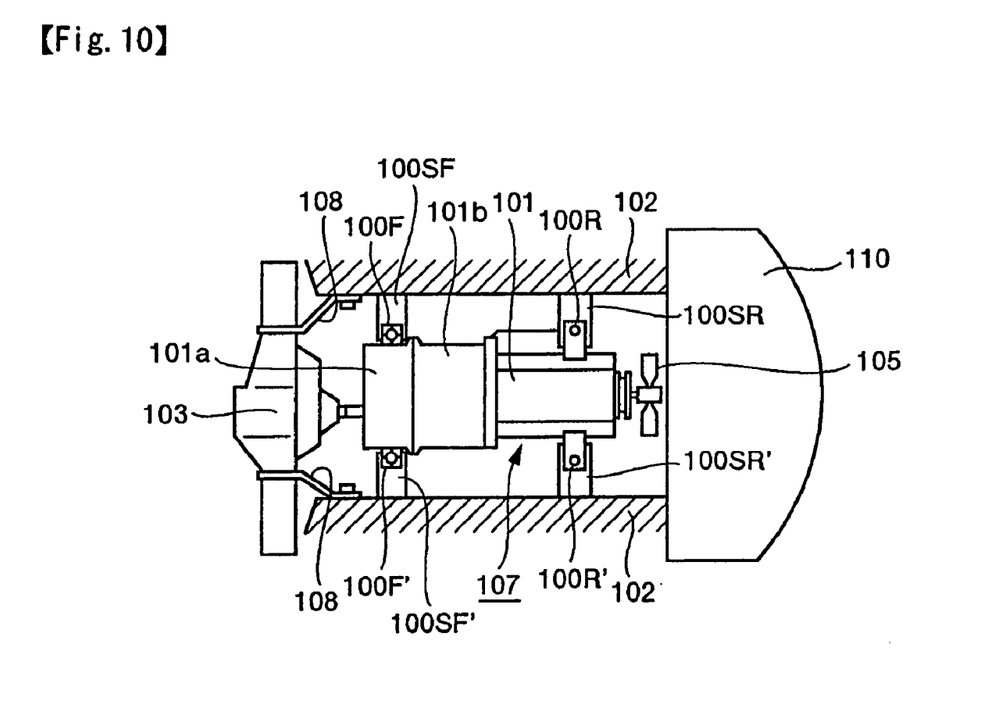
[FIG. 10] is a plan view of a first prior art corresponding to the invention.
Figure 11:
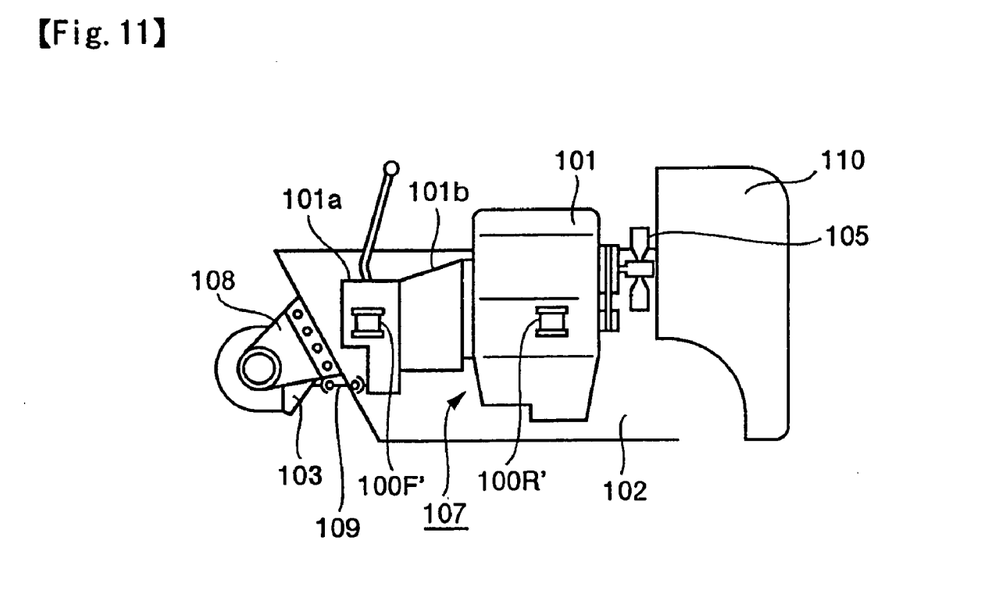
[FIG. 11] is a side view of the first prior art shown in FIG. 10.

With a conventional support structure for a forklift power train, in the case of a forklift provided with a counterweight 110 in the rear part of a body frame 102 as shown in FIGS. 10, and 11, a differential gear case 103 is attached to the front side of the body frame 102 through the intermediary of an axle support 108. Further, there is formed a power train 107 comprising an engine 101, a power transmission device 101b, such as a clutch or torque converter, and so forth, and a transmission case 101a, provided in that order from the rear side of the body frame 102, wherein an output shaft of the transmission case 101a is coupled with the differential gear case 103 side of the body frame 102 through the intermediary of an universal joint 109. Further, on the front side of the body frame 102, the power train 107 is supported by frame brackets 100SF', 100SF, installed at two locations, on the right and left side, respectively, through the support members 100F, 100F', disposed on both side faces of the transmission case 100a, on the right and left side, respectively, while, on the rear side of the body frame 102, the power train 107 is supported by frame brackets 100SR', 100SR, installed at two locations, on the right and left side, respectively, through the rear side support members 100R', 100R, respectively, thereby adopting a so-called four-point mount system.

Incidentally, with the four-point mount system described, because there is no choice but to support the power train at positions where roll vibration of the power train is large in amplitude, vibration isolation members provided at supports need to be reasonably soft in order to reduce vibration propagation to the body frame. In such a state, however, rocking (swaying back-and-forth and from side-to-side in such a case as when the vehicle is suddenly accelerated, decelerated or turned) of the power train, other than the roll vibration, increases, causing problems such as breakage of the universal joint, interference between a fan and a shroud, damage to intake and exhaust pipes, generation of abnormal sounds, and so forth.

Figure 12:
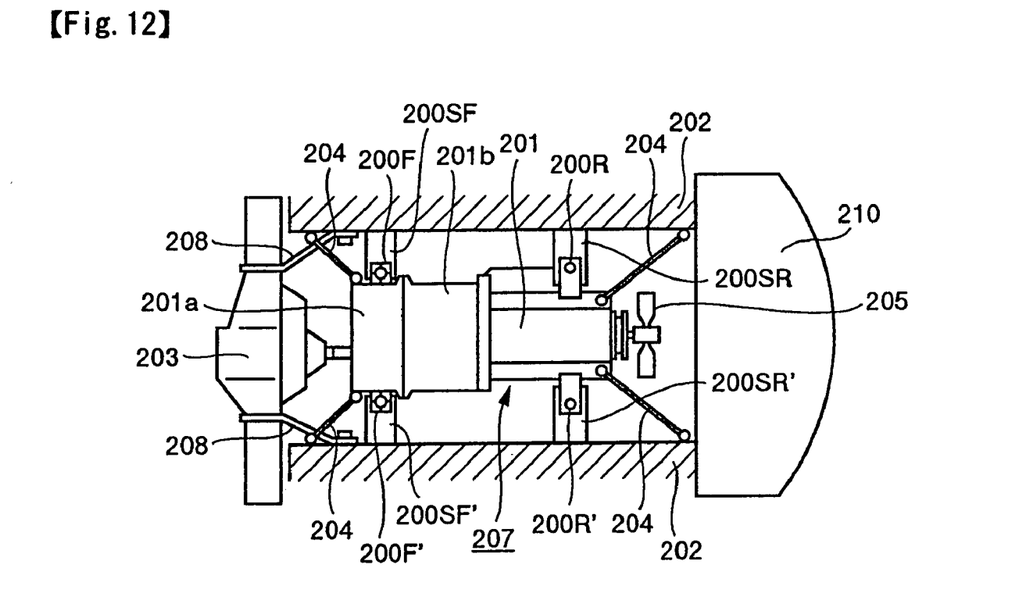
[FIG. 12] is a plan view of a second prior art corresponding to the invention.
Figure 13:
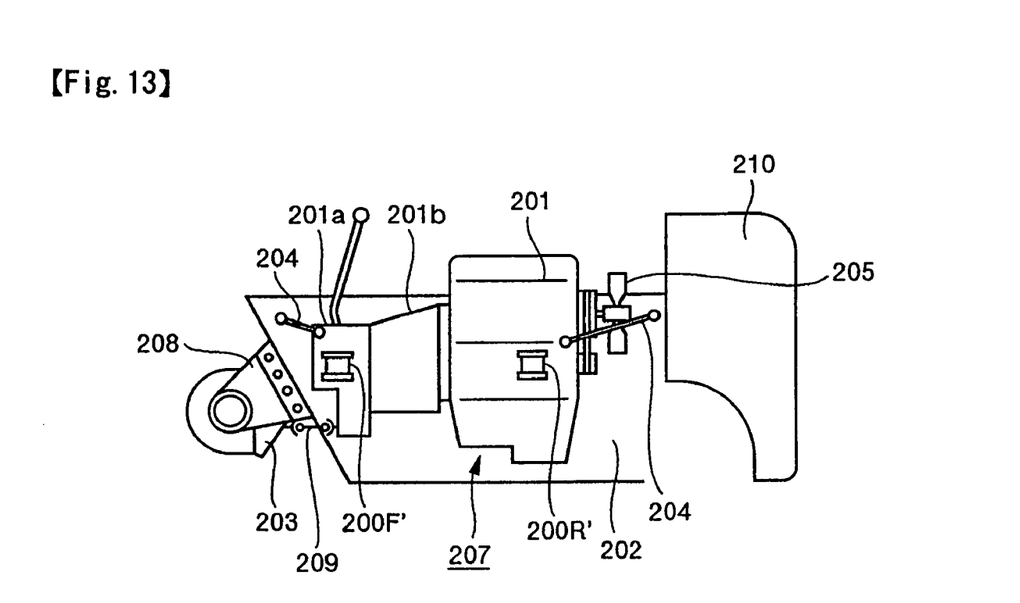
[FIG. 13] is a side view of the second prior art shown in FIG. 12.

Accordingly, as a countermeasure against the problems, there has been disclosed a technology whereby a length of wire 204 is strung at four locations via a vibration isolation member as shown in FIGS. 12, and 13, in order to restrict movement of a power train 207.

[Patent Reference 1]
Japanese Utility Model Laid-Open Publication No. 1993-54041

[Patent Reference 2]
Japanese Utility Model Laid-Open Publication No. 1986-61225

DISCLOSURE OF THE INVENTION

[Problems to be Solved by the Invention]
With a support system according to Japanese Utility Model Laid-Open Publication No. 1993-54041, since the length of the wire 204 is strung from the four locations as shown FIGS. 12, and 13, the structure of the support system becomes complex and space for executing the mounting of the power train 207 is required, so that there arises a design problem of where to dispose the same, and so on, as well as a cost problem.

Besides those problems described above, there are also other problems from the viewpoint of ease of assembling, and maintainability, such as a problem that vibration transmission to a degree is occurred to the support system through the wire 204 at the four locations, respectively, a problem of necessity of adjusting variation in deflection of the vibration isolation members by use of shims if mount positions at the four locations undergo variation in dimension in the vertical direction as an intrinsic problem in the case of the four-point mount system, a problem of necessity of finely adjusting tightness of the lengths of the wire 204 when restricting movement of the power train 207 by the wire 204, and so forth.

In FIGS. 12 and 13, reference numerals 200F, 200F', 200SF, 200SF', 200R, 200R', 200SR, and 200SR' correspond to those 100F, 100F', 100SF, 100SF', 100R, 100R', 100SR, and 100SR', shown in FIGS. 10 and 11, respectively, denoting the same members, respectively. Further, in FIGS. 12 and 13, reference numerals 201, 201a, and 201b, correspond to those 101, 101a, and 101b, shown in FIGS. 10 and 11, respectively, denoting the same members, respectively. Still further, in FIGS. 12 and 13, reference numerals 202, 203, 205, 208, and 210 correspond to those 102, 103, 105, 108, and 110, shown in FIGS. 10 and 11, respectively, denoting the same members, respectively.

With Japanese Utility Model Laid-Open Publication No. 1986-61225, in the case of a four-wheel-drive automobile, a technology based on a three-point mount system is disclosed as a support system for a power train having a transfer with a four-wheel-drive power take-off part protruding sideways, whereby, in a power train having an engine, a transmission, and a transfer for taking off power sideways, vibration due to weight unbalance is absorbed by offsetting both side faces of the engine on the right and left sides, and mount members supporting the transfer, sideways from the axis of the power train to be thereby disposed on the torque axis (corresponding to the roll axis according to the invention) in the back-and-forth direction.

In the case of the power train having the transfer as described above, however, if the power train is supported on the torque axis of the transfer, such supporting positions are off the axis of the power train, and the torque axis is offset from the position of the center of gravity of the power train, so that moment occurs around supports of the transfer at a time of a quick move of a vehicle, such as sudden acceleration, sudden deceleration, sudden turning, and so forth, and rocking in the roll direction occurs to the power train, thereby raising a possibility of aggravation in driving condition. Accordingly, means for restricting rocking of the power train, in the roll direction, are required separately.

Incidentally, a forklift power train is not provided with such a transfer as described above, and so forth, causing weight unbalance in the transverse direction.

The present invention is developed focusing on the problems described, and it is an object of the invention to provide a support system for a forklift power train, simpler in construction, capable of significantly reducing vibration, and excellent in respect ease of assembling, and maintainability.

[Means for Solving the Problems]
A support system for a power train of a forklift in a support structure for the power train of the forklift having a counterweight in the rear part of a body frame according to the first aspect of the invention is characterized in that while a front side support is provided at one location positioned at a differential gear case or a frame side cross member and in the vicinity of the roll axis of the power train, a rear side support is provided at two locations, on the right and left sides of the roll axis of the power train, respectively, in the rear part of the body frame, thereby supporting the power train at three locations in all.

A support system for a power train of a forklift of the second aspect of the invention depending mainly on the first aspect of the invention is characterized in that right and left supports serving as the rear side supports of the power train are disposed so as to form a V-shaped mount structure in the rear part of the body frame.

A support system for a power train of a forklift of the third aspect of the invention depending mainly on the first or second aspect of the invention is characterized in that a support member installation face disposed horizontally is provided on the upper surface of the differential gear case, and a bracket having a support member installation face disposed horizontally, opposite to the support member installation face, in the vertical direction, is fixed to a front face wall of a transmission case, in the vicinity of the roll axis of the power train, a support member of the power train, having vibration isolation members being disposed between the two support member installation faces.

A support system for a power train of a forklift of the fourth aspect of the invention depending mainly on the third aspect of the invention is characterized in comprising a lower plate having a crest formed by protruding the center thereof upward in an inverted-V shape, flat parts provided with an installation hole, respectively, at both ends thereof, on the right and left skirts thereof, away from the crest, a slope slanting downward extending the crest protruded upward in the inverted-V-shape with each of the both ends of the lower plate, on the right and left skirts thereof, away from the crest, and a fixture portion for a vibration isolation member, provided on the outer surfaces of the slopes on the right and left sides, respectively, an upper plate having a flat crest formed at the center thereof, slopes extending from the flat crest and slanting downward to the right and left sides, respectively, the slopes on the right and left sides, respectively, being formed so as to be in parallel with the slopes formed on the right side and the left side, respectively, of the crest of the lower plate, protruded upward in the inverted-V shape, a fixture portion for a vibration isolation member served by each of the inner surfaces of the slopes on the right and left sides, respectively, parallel with the respective slopes of the lower plate, and an installation bolt protruding upward, fixed to the center of the upper plate, wherein the lower plate is integrated with the upper plate at the respective fixture portions for the vibration isolation members through the respective vibration isolation members.

A support system for a power train of a forklift of the fifth aspect of the invention depending mainly on the fourth aspect of the invention is characterized in that the vibration isolation member is fixed to the respective outer surfaces of the slopes formed on the right side and the left side of the crest of the lower plate, protruded upward in the inverted-V shape, the flat crest is formed at the center of the upper plate, the slopes extending from the flat crest and slanting downward to the right and left sides, respectively, are formed, those slopes are formed so as to be in parallel with the slopes formed on the right side and the left side, respectively, of the crest of the lower plate, protruded upward in the inverted-V shape, the outer surface of the vibration isolation member fixed to the respective outer surfaces of the slopes of the lower plate is fixed to the respective inner surfaces of the slopes, on the right side and the left side, in parallel with the slopes of the lower plate, the installation bolt protruding upward is fixed to the center of the upper plate, and further, over the outer surface of the upper plate, a back-and-forth direction stopper plate, in substantially the letter U, is disposed in a direction crossing the upper face of the upper plate, and apart by a predetermined distance from a back-and-forth direction stopper vibration isolation member, deposited in such a way as to cover from the inner surface of the crest of the lower plate, protruded upward in the inverted-V shape, around the edges of back-and-forth ends thereof, to the outer surface thereof, thereby inserting the installation bolt fixed to the underside of the upper plate into a through-hole for the installation bolt, provided at the center of the back-and-forth direction stopper plate, in substantially the letter U, to be securely held together with the bracket fixed to the front face wall of the transmission case by tightening up nuts.

[Effect of the Invention]

Figure 1:
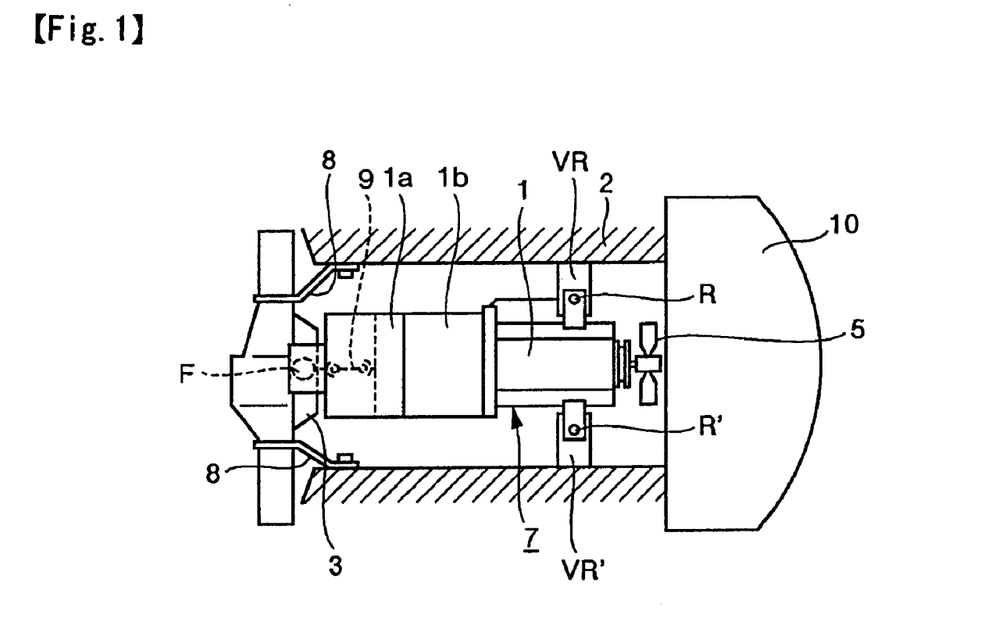
[FIG. 1] is a plan view showing a first embodiment of a support system for a forklift power train, according to the invention.
Figure 2:
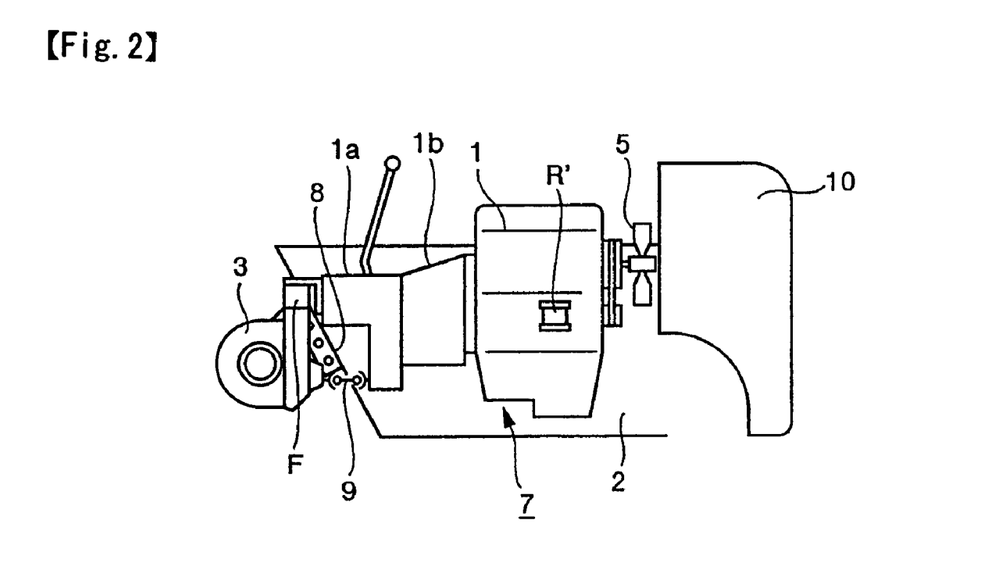
[FIG. 2] is a side view of the first embodiment shown in FIG. 1.
Figure 3:
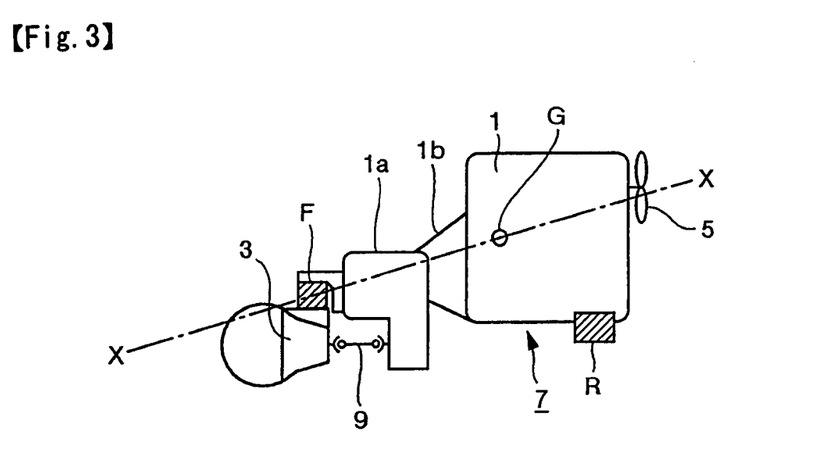
[FIG. 3] is a side view showing a second embodiment of a support system for a forklift power train, according to the invention.

With the configuration described above, wherein with a three-point mount system adopted as shown in FIGS. 1 to 3, by disposing the front side support at one location in the vicinity of the roll axis, where an amplitude of the roll vibration of the power train is small, vibration transmission to a body side can be reduced as compared with that of the four-point mount system.

Further, since the forklift is provided with the counterweight in the rear part of the body thereof, the forklift has its inherent characteristics that the closer a position is to the counterweight, the less vibration transmission to the position tends to be, thereby reinforcing the vibration isolation effect of the three-point mount system with a synergistic effect.

More specifically, with the four-point mount system, because supports at two points, the right and left sides, respectively, on the rear side, are disposed close to the counterweight, these supports can obtain the vibration isolation effect to a degree, however, supports at two points, the right and left sides, respectively, on the front side, are disposed farther from the counterweight, so that vibration tends to be transmitted to the body side therethrough. In contrast, with the three-point mount system, by bringing the front side support location at one point closer to the roll axis of the power train as described above, vibration transmission to the body side can be significantly reduced, so that the forklift can have obtained an advantageous effects over an effect due to simply changing from the four-point mount system to the three-point mount system.

Further, as shown in FIG. 3, with the three-point mount system, the front side support is located in the vicinity of the inertial main axis (the roll axis X—X), so that the roll vibration of the power train is very small in amplitude, and even if rigidity of the support is raised, there does not occur deterioration in vibration. Accordingly, this makes it possible to use a reasonably harder vibration isolation member at the support. Furthermore, as for the supports at two points on the rear side, as well, the rigidity of the supports can be raised (the vibration isolation members can be rendered harder) as compared with the case of the four-point mount system for the following reason.

Figure 9:
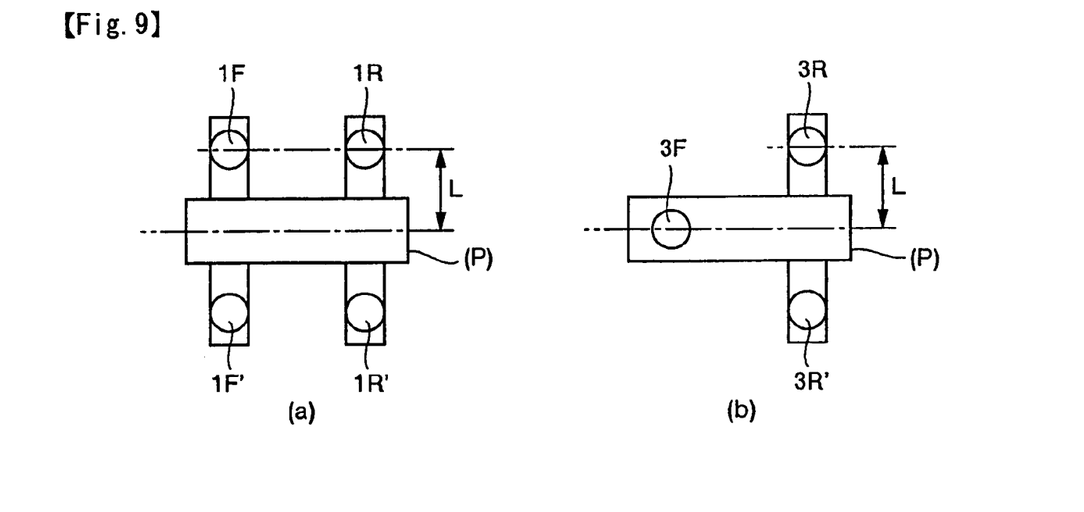
[FIG. 9] is schematic illustrations showing superiority of the three-point mount system over the four-point mount system with reference to forklift mount methods.

More specifically, in FIG. 9(a), assuming that a supporting capacity of one support is K, the sum total of support rigidities (moment) against the roll vibration of a power train in the case of the four-point mount system is represented by K×L×4.

Then, in FIG. 9(b), assuming that a supporting capacity of one support is K', the sum total of support rigidities (moment) against the roll vibration of a power train in the case of the three-point mount system is represented by K'×L×2.

Accordingly, on the assumption that K=K' (vibration isolation members are identical to each other), with the three-point mount system, the support rigidities become half those in the case of the four-point mount system, so that the power train can be more gently supported. Further, with the three-point mount system, in the case of rendering the support rigidities equivalent to those for the four-point mount system, it need only be sufficient to render the vibration isolation members twice as harder (K'=2K).

With the three-point mount system using the supports having enhanced rigidity, vibration of a large amplitude can be suppressed against the rocking of the power train, other than the roll vibration generated in such a case as when the vehicle is suddenly accelerated, decelerated or turned, and so forth, so that it is possible to aim at both prevention of troubles, such as breakage of the universal joint, interference between a fan and shroud, damage to intake and exhaust pipes, generation of abnormal sounds, and so forth, and reduction in vibration propagation to the body side.

Still further, with the three-point mount system, sufficient vibration isolation effects are obtained even if the vibration isolation members are rendered harder to a degree as described above. Accordingly, since the amplitude (strain) of the roll vibration also is small, this method is effective even in respect of durability of the vibration isolation members.

Further, with the four-point mount system, even when mounting the power train, as there are many installation locations for the supports, not only a large quantity of components, but also adjustment of the shims, and so forth, is required for alignment of heights of the four-points, resulting in poor installation workability while with the three-point mount system, it need only be sufficient to mount the front side support at one location positioned substantially at the center of the power train, in the transverse direction thereof, and the rear side supports at two locations, respectively, without the need for adjustment of the shims, so that this method is superior in respect of installation space saving, installation workability, and cost.

Figure 4:
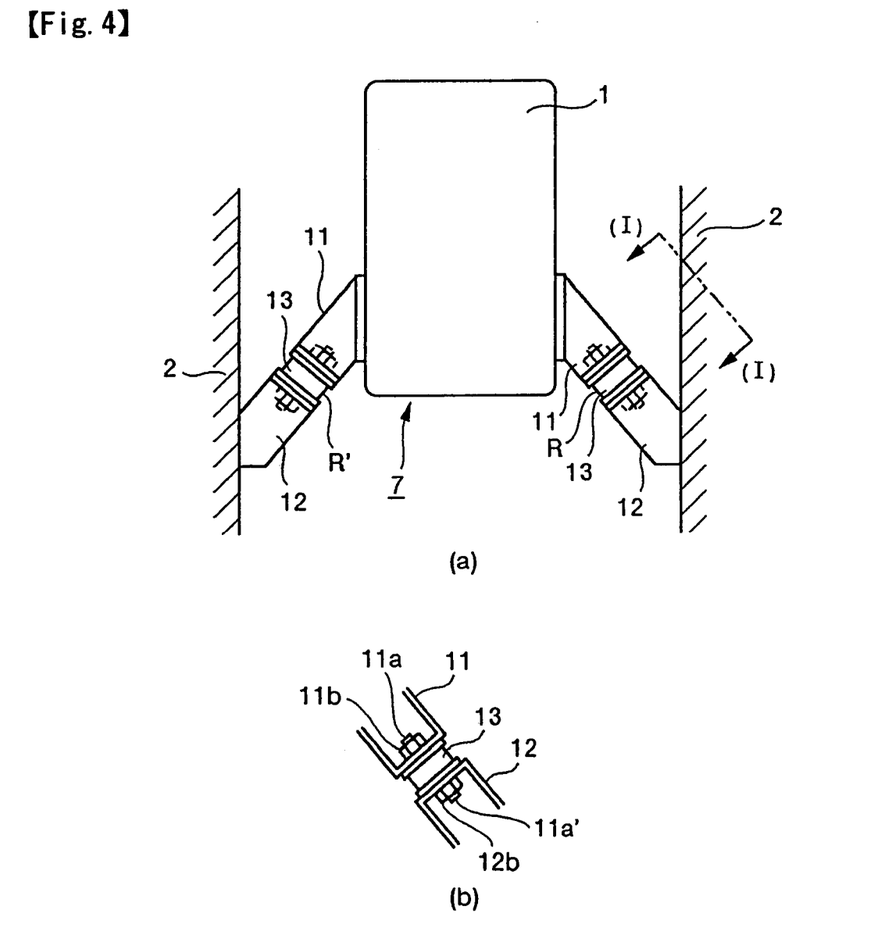
[FIG. 4] is a view showing a power train being supported at two points of a V-shaped mount structure on the rear side thereof, wherein FIG. 4 (a) is a front view of the V-shaped mount structure, and FIG. 4 (b) is a view of a support of the V-shaped mount structure, as seen from the direction of arrows (I)—(I) in FIG. 4(a).

Further, with the adoption of the three-point mount system, the front side support is located in the vicinity of the roll axis of the power train, where vibration is small in amplitude, and at the same time, a V-shaped mount structure is adopted on the rear side as shown in FIG. 4, so that the V-shaped mount structure is caused to gently receive amplitude against the roll vibration of the power train, in the shear direction of the vibration isolation members, smaller in spring constant than the compression direction thereof, thereby enabling vibration transmission to the body side to be significantly reduced.

Further, since the front side support is disposed at a location closer to the center G of gravity, in the vertical direction, vibration can be effectively suppressed against vibration of the power train, other than the roll vibration, and against the rocking (swaying back-and-forth and from side-to-side in such a case as when the vehicle is accelerated, decelerated or turned) of the power train, accompanying vehicle driving, thereby enabling prevention of the breakage of the universal joint, the interference between the fan and shroud, the damage to the intake and exhaust pipes, the generation of abnormal sounds, and so forth.

BRIEF DESCRIPTION OF THE DRAWINGS

[FIG. 5] is a view of a power train including a support member for supporting the power train with reference to the first and second embodiments of the invention, respectively, at one point on the front side thereof, and the periphery of the support member, wherein FIG. 5(a) is a front view of the support member, as seen from the front side of the power train, and FIG. 5(b) is a side view of the power train including the support member and the periphery thereof.

[FIG. 6] is an enlarged view of a support member for supporting the power train with reference to the first and second embodiments of the invention, respectively, at one point on the front side of the power train, wherein FIG. 6(a) is an enlarged front view of the support member on the front side, as seen from the front side of the power train, and FIG. 6(b) is an enlarged side view of the support member on the front side, as seen from the side of the power train.

EXPLANATION OF THE NUMERALS 1, 51 . . . Engine
1a, 51a . . . transmission case
1b, 51b . . . power transmission device
2, 52 . . . body frame
3, 53 . . . differential gear case
5, 55 . . . cooling fan
56 . . . cross member
7, 57 . . . power train
8, 58 . . . axle support
9, 59 . . . universal joint
10, 60 . . . counterweight
F, 50F . . . front side support member
R', 50R . . . rear side support member (left)
R, 50R . . . rear side support member (right)
VR', 50VR' . . . frame bracket (left)
VR, 50VR . . . frame bracket (right)

G . . . center of gravity
X—X . . . roll axis
11 engine side mount bracket
11a, 11a' . . . installation bolt (support member side)
11b . . . nut
12 . . . frame side mount bracket
12b . . . nut
13 . . . vibration isolation member
14 . . . transmission case side bracket
15 . . . installation bolt
16 . . . lower plate (support member)
17 . . . upper plate (support member)
18 . . . installation bolt
19 . . . vibration isolation member
20 . . . vibration isolation member for back-and-forth direction stopper
21 . . . plate for back-and-forth direction stopper
22 . . . support member installation face on the upper surface of a differential gear case
23 . . . front face wall of a transmission case
24 . . . support member installation face on the underside surface of the bracket
28 . . . installation bolt

BEST MODE FOR CARRYING OUT THE INVENTION

FIG. 1 is a plan view showing a first embodiment of a support system for a forklift power train, according to the invention, and FIG. 2 is a side view of the first embodiment shown in FIG. 1.

FIG. 3 is a side view showing a second embodiment of a support system for a forklift power train according to the invention.

FIG. 4 is a view showing a power train being supported at two points of a V-shaped mount structure on the rear side thereof, wherein FIG. 4(a) is a front view of the V-shaped mount structure, and FIG. 4(b) is a view of a support of the V-shaped mount structure, as seen from the direction of arrows (I)—(I) in FIG. 4(a).

Figure 5:
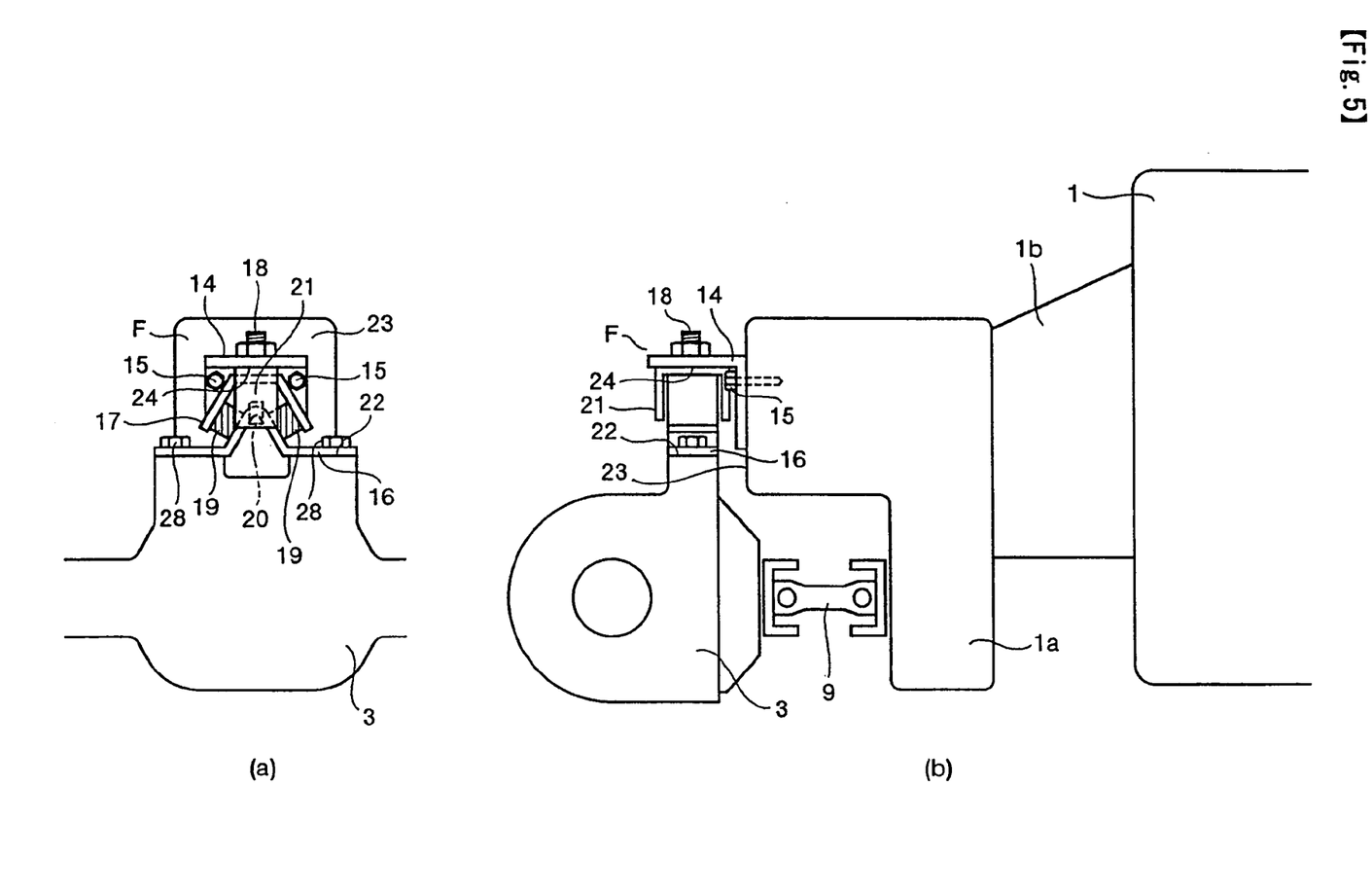

FIG. 5 is a view of a power train including a support member for supporting the power train with reference to the first and second embodiments of the invention, respectively, at one point on the front side thereof, and the periphery of the support member, wherein FIG. 5(a) is a front view of the support member, as seen from the front side of the power train, and FIG. 5(b) is a side view of the power train including the support member and the periphery thereof.

Figure 6:
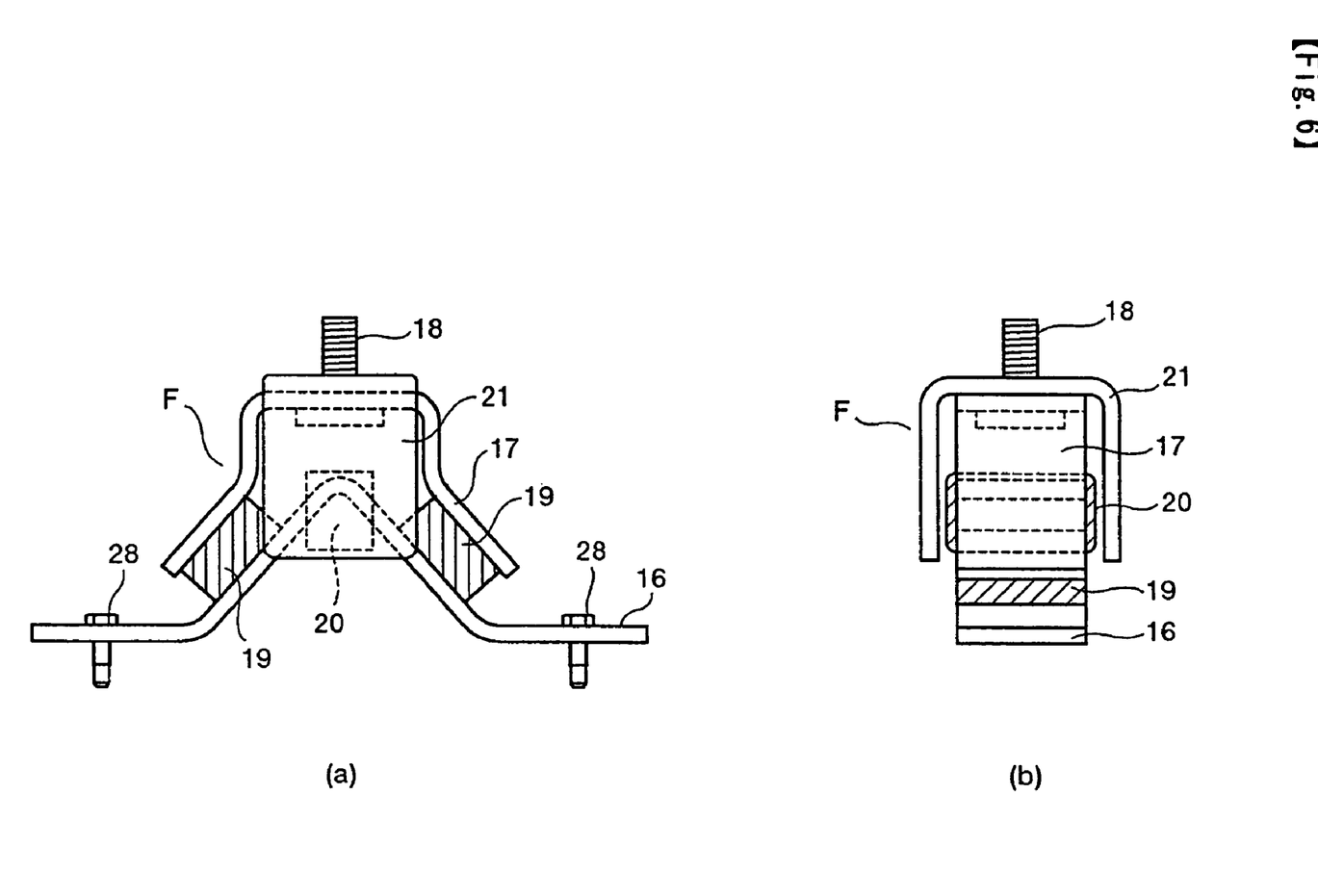

FIG. 6 is an enlarged view of a support member for supporting the power train with reference to the first and second embodiments of the invention, respectively, at one point on the front side of the power train, wherein FIG. 6(a) is an enlarged front view of the support member on the front side, as seen from the front side of the power train, and FIG. 6(b) is an enlarged side view of the support member on the front side, as seen from the side of the power train.

Figure 7:
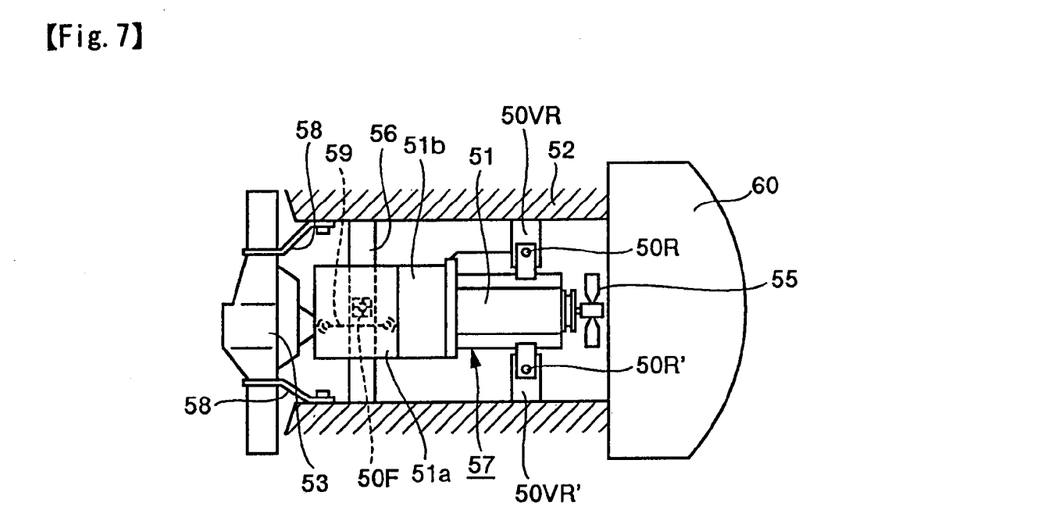
[FIG. 7] is a plan view showing a third embodiment of a support system for a forklift power train, according to the invention.
Figure 8:
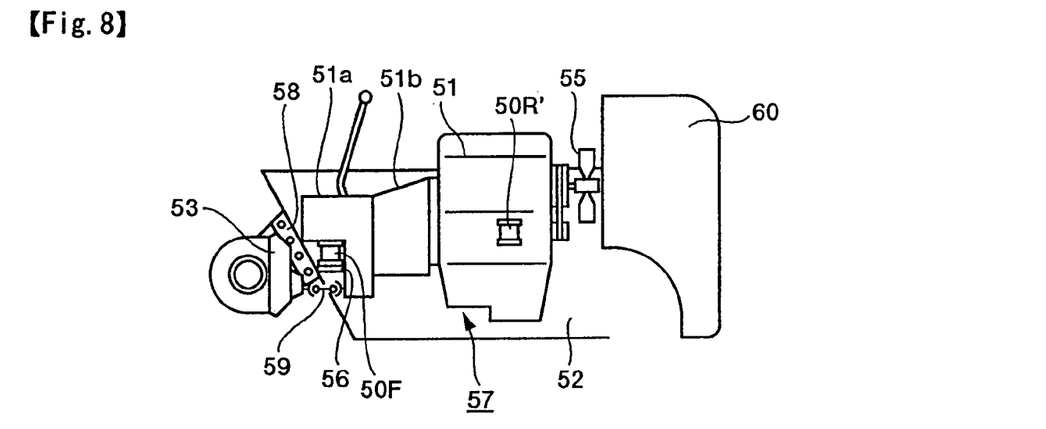
[FIG. 8] is a side view of the third embodiment shown in FIG. 7.

FIG. 7 is a plan view showing a third embodiment of a support system for a forklift power train, according to the invention, and FIG. 8 is a side view of the third embodiment shown in FIG. 7.

Best mode of a support system for a forklift power train, according to the invention, is described hereinafter with reference to the accompanying drawings.

In FIGS. 1, and 2, with a forklift provided with a counterweight 10 in the rear part of a body frame 2, a differential gear case 3 is attached to the front side of the body frame 2 by an axle support 8. Further, a power train 7 comprises an engine 1, a power transmission device 1b including a clutch or torque converter, and so forth, and a transmission case 1a, provided in that order from the rear side of the body frame 2, wherein an output shaft of the transmission case 1a is linked with the differential gear case 3 side by an universal joint 9. The power train 7 is supported by frame brackets VR', VR, at two locations on the rear side of the body frame 2, through rear side support members R', R, respectively, and on the front side of the body frame 2, a front side support member F is disposed at one location positioned between the differential gear case 3 and the transmission case 1a, and in the vicinity of the roll axis of the power train 7, thereby adopting a configuration for supporting the power train 7 at three locations in all.

In FIGS. 3 and 4, with a front side support member F of a power train 7 being disposed in the vicinity of the roll axis X—X, rear side support members R', R, of frame side mount brackets 12, 12, respectively, on the right and left side, are disposed such that installation faces thereof are in a shape resembling the letter V, thereby adopting a so-called V-shaped mount structure, and engine side mount brackets 11, 11 are linked with the frame side mount brackets 12, 12 by nuts 11b, 12b, respectively, through the intermediary of a pair of the rear side support members R', R on the right and left side, respectively, having a pair of vibration isolation members 13, 13, on the right and left side, respectively, and provided with support member side installation bolts 11a, 11a'.

In FIG. 5, a support member installation face 22 disposed horizontally is provided on the upper surface of a differential gear case 3, and an L-shaped transmission case side bracket 14 having a support member installation face 24 disposed horizontally, opposite to the support member installation face 22, in the vertical direction, is fixed to a front face wall 23 of a transmission case 1a (in the vicinity of the roll axis of a power train) by an installation bolt 15. Then, a front side support member F of the power train, having vibration isolation members 19, 19, is disposed between the two support member installation faces 22, 24, and while a lower plate 16 of the front side support member F is installed on the support member installation face 22 provided on the upper surface of the differential gear case 3 by installation bolts 28, 28, an installation bolt 18 fixed to an upper plate 17 of the front side support member F is secured to the transmission side bracket 14 by a nut.

In FIG. 6, with a configuration of the front side support member F, the center of the lower plate 16 is protruded upward in an inverted-V shape to form a crest, both ends of the lower plate 16, on the right and left skirts thereof, away from the crest, are flat parts provided with an installation hole, respectively, the crest protruded upward in the inverted-V shape is extending to the both ends of the lower plate 16, on the right and left skirts thereof, away from the crest, a slope slanting downward, and the outer surfaces of the slopes on the right and left sides, respectively, each have a fixture portion for the vibration isolation member. Further, the upper plate 17 has a flat crest formed at the center thereof, slopes extending from the flat crest and slanting downward to the right and left sides, respectively, are formed, the slopes on the right and left sides, respectively, are formed so as to be in parallel with the slopes formed on the right side and the left side, respectively, of the crest of the lower plate 16, protruded upward in the inverted-V shape, and while the underside surfaces of the slopes on the right and left sides, respectively, parallel with the respective slopes of the lower plate 16, each serve as a fixture portion for the vibration isolation member 19, an installation bolt 18 protruding upward is fixed to the center of the upper plate 17. Further, the lower plate 16 is integrated with the upper plate 17 at the respective fixture portions for the vibration isolation members through the respective vibration isolation members 19.

Further, as a configuration of back-and-forth direction stopper members 20, 21 of the front side support member F, the vibration isolation member 19 is fixed to the respective upper surfaces of the slopes formed on the right side and the left side of the crest of the lower plate 16, protruded upward in the inverted-V shape, the flat crest is formed at the center of the upper plate 17, the slopes extending from the flat crest and slanting downward to the right and left sides, respectively, are formed, those slopes are formed so as to be in parallel with the slopes formed on the right side and the left side, respectively, of the crest of the lower plate 16, protruded upward in the inverted-V shape, and while the outer surface of the vibration isolation member 19 fixed to the respective upper surfaces of the slopes of the lower plate 16 is fixed to the respective inner surfaces of the slopes, on the right side and the left side, in parallel with the slopes of the lower plate 16, the installation bolt 18 protruding upward is fixed to the center of the upper plate 17. Still further, on top of the upper plate 17, the back-and-forth direction stopper plate 21, formed in substantially the letter U, is disposed in a direction intersecting the face of the upper plate, in the longitudinal direction, and apart in a predetermined distance from the back-and-forth direction stopper vibration isolation member 20, formed by vulcanizing on the both end portions and the inner surface as well as the outer surface of the crest of the lower plate 16, protruded upward in the inverted-V shape, and the surfaces of both edges of the lower plate 16, in a transverse direction orthogonal to the longitudinal direction thereof, joining the underside surface with the outer surface, and a through-hole for the installation bolt is provided at the center of the back-and-forth direction stopper plate 21 to be thereby secured by inserting the installation bolt 18 into the through-hole, further those back-and-forth direction stopper member 21 being securely held together by being tightened up, together with the transmission side bracket 14 fixed to the front face wall 23 of the transmission case 1a.

In FIGS. 7, and 8, with a forklift provided with a counterweight 60 in the rear part of a body frame 52, a differential gear case 53 is attached to the front side of the body frame 52 by an axle support 58. A power train 57 comprises an engine 51, a power transmission device 51b including a clutch or torque converter, and so forth, and a transmission case 51a, provided in that order from the rear side of the body frame 52, wherein an output shaft in the transmission case 51a is coupled with the differential gear case 53 side through a universal joint 59. The power train 57 is supported by frame brackets 50VR', 50VR, on the rear side thereof, through the intermediary of rear side support members 50R', 50R, respectively, while on the front side thereof, a front side support member 50F is provided at one location, and as a frame side support member 56 thereof, a frame side cross member 56 is disposed at a location where the transmission case 51a can be supported by the front side support member 50F, thereby disposing the front side support member 50F between the cross member 56 and the transmission case 51a, and in the vicinity of the roll axis of the power train 57, so that there is adopted a configuration for supporting the power train 57 at three locations in all.

First Embodiment

FIG. 1 is the plan view showing the first embodiment of the invention, and FIG. 2 is the side view of the first embodiment shown in FIG. 1.

With the forklift provided with the counterweight 10 in the rear part of the body frame 2, the differential gear case 3 is coupled to the front side of the body frame 2 through the axle support 8. Further, the power train 7 comprises an engine 1; a power transmission device 1b including a clutch or torque converter, and so forth, and a transmission case 1a, provided in that order from the rear side of the body frame 2, wherein the output shaft of the transmission case 1a is coupled with the differential gear case 3 side by the universal joint 9. The power train 7 is supported by the frame brackets VR', VR, at the two locations on the rear side of the body frame 2, by the rear side support members R', R, respectively, and on the front side of the body frame 2, the front side support member F is disposed at the one location positioned between the differential gear case 3 and the transmission case 1a, and in the vicinity of the roll axis of the power train 7, thereby adopting the configuration for supporting the power train 7 at the three locations in all.

Since a forklift is normally fitted with the counterweight 10 provided in the rear part of the body thereof, and the forklift has its specific characteristic in that the supporting location closer to the counterweight 10 leads to harder vibration transmission to the body frame. The three-point mount system adopted in the forklift can provide enhanced vibration isolation effect.

Further, with the three-point mount system, the front side support member F is located in the vicinity of the main axis of inertia (the roll axis), so that the roll vibration of the power train 7 is very low in vibration amplitude, and even if rigidity of supports is raised, there does not occur so much aggravation in vibration. Accordingly, this makes it possible to use a reasonably harder vibration isolation member for the front side support member F. Furthermore, as for the supports at two points on the rear side, the rigidity of the supports can be raised (the vibration isolation members can be rendered harder) as compared with the case of the four-point mount system. Accordingly, since the amplitude (strain) of the roll vibration also is small, this method is effective even in respect of durability of the vibration isolation members.

Since the reasonably harder vibration isolation member can be used, vibration of a large amplitude can be suppressed against the rocking of the power train, other than roll vibration, occurred in such a case as when the vehicle is driven on rough road, accelerated, decelerated, turned, or the like, so that it is possible to aim at both the prevention of the troubles such as breakage of the universal joint, interference between the fan and shroud, damage to the intake and exhaust pipes, generation of abnormal sounds, and so forth, and reduction in vibration transmission to the body side.

Further, with the four-point mount system, even when mounting the power train, as there are many installation locations for the supports, not only a large quantity of components, but also the adjustment of the shims, and so forth, is required for alignment of heights of the four-points, resulting in poor installation workability while with the three-point mount system, it need only be sufficient to mount the front side support at one location positioned substantially at the center of the power train, in the transverse direction thereof, and the rear side supports at two locations, respectively, without adjusting the shims, so that this system is superior in respect of installation space saving, installation workability, and cost.

FIG. 5(a) is a front view of the power train 7 according to the first embodiment of the invention, including the front side support member F and the periphery thereof, and FIG. 5(b) is a side view of the power train 7.

The support member installation face 22 disposed horizontally is provided on the upper surface of the differential gear case 3, and the L-shaped transmission case side bracket 14 having the support member installation face 24 disposed horizontally, opposite to the support member installation face 22, in the vertical direction, is fixed to the front face wall 23 of the transmission case 1a (in the vicinity of the roll axis of the power train) by the installation bolt 15. Then, the front side support member F of the power train, having the vibration isolation members 19, 19, is disposed between the two support member installation faces 22, 24, and while the lower plate 16 of the front side support member F is installed on the support member installation face 22 provided on the upper surface of the differential gear case 3 by the installation bolts 28, 28, the installation bolt 18 fixed to the upper plate 17 of the front side support member F is secured to the transmission side bracket 14 by the nut.

With the adoption of such a configuration as described above, there are obtained advantages in that the support system for the power train of the forklift according to the present embodiments is excellent in respect of ease of assembling and maintainability because the support members can be disposed in the vicinity of the roll axis of the power train, and locations of the support members are highly visible.

FIG. 6(a) is the front view of the front side support member F according to the embodiments of the invention, and FIG. 6(b) is the side view of the same.

In the configuration of the front side support member F, the center of the lower plate 16 is protruded upward in the inverted-V shape to form the crest, both ends of the lower plate 16, on the right and left skirts thereof, away from the crest, are the flat parts provided with the installation hole, respectively, the crest protruded upward in the inverted-V shape is extending to the both ends of the lower plate 16, on the right and left skirts thereof, away from the crest, through the intermediary of the slope slanting downward, and the outer surfaces of the slopes on the right and left sides, respectively, each have the fixture portion for the vibration isolation member 19. Further, the upper plate 17 has the flat crest formed at the center thereof, the slopes extending from the flat crest and slanting downward to the right and left sides, respectively, are formed, the slopes on the right and left sides, respectively, are formed so as to be in parallel with the slopes formed on the right side and the left side, respectively, of the crest of the lower plate 16, protruded upward in the inverted-V shape, and while the inside surfaces of the slopes on the right and left sides, respectively, parallel with the respective slopes of the lower plate 16, each serve as the fixture portion for the vibration isolation member 19, the installation bolt 18 protruding upward is fixed to the center of the upper plate 17. Further, the lower plate 16 is integrated with the upper plate 17 at the respective fixture portions for the vibration isolation members 19 through the intermediary of the respective vibration isolation members 19.

With the adoption of such a configuration as described above, spacing for the installation bolts to the differential gear case can be enlarged, enabling bolt-tightening work to be performed at a location where sufficient working room is available, thus enhancing workability.

Further, since the installation bolt for the transmission case side bracket can be disposed in space formed by the slopes of the upper plate, in the inverted-V shape, the configuration can be rendered compact particularly in the vertical direction, so that a work for disposing the support members in the vicinity of the roll axis is freed from constraints on space, thereby enabling the support members to be disposed at more ideal locations.

Further, by disposing the inverted-V shape of the upper plate over that of the lower plate, a force acts such that the center of the upper plate always coincides with that of the lower plate, so that the axial center of the power train tends not to deviate in the transverse direction from that of the differential gear case, thereby enabling adverse effects on the universal joint, and other constituent components to be prevented.

Further, as for the configuration of the back-and-forth direction stopper members 20, 21 of the front side support member F, the vibration isolation member 19 is fixed to the respective outer surfaces of the slopes formed on the right side and the left side of the crest of the lower plate 16, protruded upward in the inverted-V shape, the flat crest is formed at the center of the upper plate 17, the slopes extending from the flat crest and slanting downward to the right and left sides, respectively, are formed, those slopes are formed so as to be in parallel with the slopes formed on the right side and the left side, respectively, of the crest of the lower plate 16, protruded upward in the inverted-V shape, and while the outer surface of the vibration isolation member 19 fixed to the respective outer surfaces of the slopes of the lower plate 16 is fixed to the respective inner surfaces of the slopes, on the right side and the left side, in parallel with the slopes of the lower plate 16, the installation bolt 18 protruding upward is fixed to the center of the upper plate 17. Still further, on top of the upper plate 17, the back-and-forth direction stopper plate 21, formed in substantially the letter U, is disposed in the direction intersecting the face of the upper plate, in the longitudinal direction, and apart by the predetermined distance from the back-and-forth direction stopper vibration isolation member 20, formed by vulcanizing on the both end portions and the inner surface as well as the outer surface of the crest of the lower plate 16, protruded upward in the inverted-V shape, and the surfaces of the both edges of the lower plate 16, in the transverse direction orthogonal to the longitudinal direction thereof, joining the inside surface with the upper surface, and the back-and-forth direction stopper plate 21 is provided with the through-hole for the installation bolt at the center thereof to be thereby secured by inserting the installation bolt 18 into the through-hole, those back-and-forth direction stopper member 21 being further securely held together by being tightened up, together with the transmission side bracket 14 fixed to the front face wall 23 of the transmission case 1a.

Since the stopper members for restricting the back-and-forth movement of the power train can be disposed on the support member in a configuration simple and compact, there is no constraint on space when disposing the support member, and assembling properties are excellent. In addition, because the back-and-forth movement of the power train is restricted, it is possible to prevent the breakage of the universal joint, the interference between the fan and shroud, the damage to the intake and exhaust pipes, the generation of abnormal sounds, and so forth.

With the present embodiments, the front side support member F is formed such that the lower plate 16 and the upper plate 17 are respectively in the inverted-V shape protruding upward as shown in FIG. 6, however, the lower plate 16 and the upper plate 17 may be disposed so as to be in the form of the letter V respectively for large installation space and ease of assembling.

Second Embodiment

FIG. 3 is the side view of the support system for the power train 7, in the V-shaped mount structure, according to the second embodiment of the invention, FIG. 4(a) is the front view of the V-shaped mount structure, and FIG. 4 (b) is the view of the support of the V-shaped mount structure, as seen from (I)—(I) in FIG. 4(a).

With the front side support member F of the power train 7 being disposed in the vicinity of the roll axis X—X, the rear side support members R', R, on the right and left sides of the frame side mount brackets 12, 12, respectively, are disposed such that the installation faces thereof are substantially in the form of the letter V, thereby adopting the so-called V-shaped mount structure. That is, the vibration isolation members 13, 13 are sandwiched between the engine side mount brackets 11, 11 and the frame side mount brackets 12, 12, respectively, and fixed thereto, respectively, by the support member side installation bolts 11a, 11a' and the nuts 11b, 12b, thereby forming the rear side support members R', R, on the right and left sides, of the power train 7, respectively.

With the present embodiment, while the front side support according to the three-point mount system is replaced with the V-shaped mount structures, which receives vibration amplitude in the shear direction, to provide for small spring constant compared with that in the compression direction. With this mounting system, vibration amplitude against the roll motion of power train can be received gently on the mount structure, thereby enabling vibration transmission to the body side to be significantly reduced.

Further, since the front side support according to this embodiment is positioned adjacent to the center G of gravity, in the vertical direction, it can also effectively receive vibration of the power train but roll vibration such as saying in the longitudinal and in the transverse directions occurred in such a case as when the vehicle is accelerated, decelerated or turned, thereby preventing from breakage of the universal joint, interference between the fan and shroud, damage to the intake and exhaust pipes, generation of abnormal sounds.

Third Embodiment

FIG. 7 is the plan view of the third embodiment of the invention, and FIG. 8 is the side view of the third embodiment shown in FIG. 7.

With the forklift provided with the counterweight 60 in the rear part of the body frame 52, the differential gear case 53 is attached to the front side of the body frame 52 by the axle support 58. The power train 57 comprises the engine 51, the power transmission device 51b including the clutch or torque converter, and so forth, and the transmission case 51a, provided in that order from the rear side of the body frame 52, wherein the output shaft in the transmission case 51a is coupled with the differential gear case 53 side through the intermediary of the universal joint 59. Further, the power train 57 is supported by the frame brackets 50VR', 50VR, through the rear side support members 50R', 50R, respectively, on the rear side thereof while on the front side thereof, the front side support member 50F is provided at one location and on the frame side cross member 56, the frame side cross member 56 is disposed at the location where the transmission case 51a can be supported through the front side support member 50F, thereby disposing the front side support member 50F between the cross member 56 and the transmission case 51a, and in the vicinity of the roll axis of the power train 57, so that there is adopted the configuration for supporting the power train 57 at the three locations in all.

With the present embodiment, since the power train 57 is supported fully by the supports attached to the body frame side, even if dismounting the differential gear case 53 is required to dismount from the body frame 52, the support member 50F of the power train 57 remains disposed between the cross ember and the transmission case, thereby this embodiment provides excellent maintainability. In addition, the present embodiment has another advantageous effect in that the rigidity of the frame is enhanced with the cross member.

Further, with the present embodiment, the frame side cross member 56 is provided at a location enabling the front side support member 50F to be disposed under a front side protrusion of the upper part of the transmission case 51a, however, the location is not limited thereto. Instead, the frame side cross member 56 may be provided at a location enabling the front side support member 50F to be disposed in front of the front side protrusion of the upper part of the transmission case 51a as shown in the first embodiment.

What is claimed is:

1. A support system for a power train of a forklift having a counterweight in the rear part of a body frame, characterized in that while a front side support is provided at one location positioned at a differential gear case and in the vicinity of the roll axis of the power train, a rear side support is provided at two locations, on the right and left sides of the roll axis of the power train, respectively, in the rear part of the body frame, thereby supporting the power train at three locations in all.

2. A support system for a power train of a forklift according to claim 1, characterized in that right and left supports serving as the rear side supports of the power train are disposed so as to form a V-shaped mount structure in the rear part of the body frame.

3. A support system for a power train of a forklift according to claims 1 or 2, characterized in that a support member installation face disposed horizontally is provided on the upper surface of the differential gear case, and a bracket having a support member installation face disposed horizontally, opposite to the support member installation face, in the vertical direction, is fixed to a front face wall of a transmission case, in the vicinity of the roll axis of the power train, a support member of the power train, having vibration isolation members being disposed between the two support member installation faces.

4. A support system for a power train of a forklift according to claim 3, characterized in comprising a lower plate having a crest formed by protruding the center thereof upward in an inverted-V shape, flat parts provided with an installation hole, respectively, at both ends thereof, on the right and left skirts thereof, away from the crest, a slope slanting downward extending the crest protruded upward in the inverted-V-shape with each of the both ends of the lower plate, on the right and left skirts thereof, away from the crest, and a fixture portion for a vibration isolation member, provided on the outer surfaces of the slopes on the right and left sides, respectively; an upper plate having a flat crest formed at the center thereof, slopes extending from the flat crest and slanting downward to the right and left sides, respectively, the slopes on the right and left sides, respectively, being formed so as to be in parallel with the slopes formed on the right side and the left side, respectively, of the crest of the lower plate, protruded upward in the inverted-V shape, a fixture portion for a vibration isolation member served by each of the inner surfaces of the slopes on the right and left sides, respectively, parallel with the respective slopes of the lower plate, and an installation bolt protruding upward, fixed to the center of the upper plate, wherein the lower plate is integrated with the upper plate at the respective fixture portions for the vibration isolation members through the respective vibration isolation members.

5. A support system for a power train of a forklift according to claim 4, characterized in that the vibration isolation member is fixed to the respective outer surfaces of the slopes formed on the right side and the left side of the crest of the lower plate, protruded upward in the inverted-V shape. the flat crest is formed at the center of the upper plate, the slopes extending from the flat crest and slanting downward to the right and left sides, respectively, are formed, those slopes so as to be in parallel with the slopes formed on the right side and the left side, respectively, of the crest of the lower plate, protruded upward in the inverted-V shape, the outer surface of the vibration isolation member fixed to the respective outer surfaces of the slopes of the lower plate is fixed to the respective inner surfaces of the slopes, on the right side and the left side, in parallel with the slopes of the lower plate, the installation bolt protruding upward is fixed to the center of the upper plate, and further, over the outer surface of the upper plate, a back-and-forth direction stopper plate, in substantially the letter U, is disposed in a direction crossing the outer surface of the upper plate, and apart by a predetermined distance from a back-and-forth direction stopper vibration isolation member, formed by vulcanizing on the both end portions and the inner surface as well as the outer surface of the crest of the lower plate, protruded upward in the inverted-V shape, around the edges of back-and-forth ends thereof, to the outer surface thereof, thereby inserting the installation bolt fixed to the underside of the upper plate into a through-hole for the installation bolt, provided at the center of the back-and-forth direction stopper plate, in substantially the letter U, to be securely held together with the bracket fixed to the front face wall of the transmission case by tightening up nuts.

* * * * *